US012764650B2

(12) United States Patent
Kawai

(10) Patent No.: US 12,764,650 B2
(45) Date of Patent: Oct. 13, 2026

(54) INFORMATION PROCESSING APPARATUS, METHOD FOR CONTROLLING THE SAME, AND STORAGE MEDIUM FOR CONNECTING A COMMUNICATION APPARATUS TO AN ACCESS POINT

(71) Applicant: CANON KABUSHIKI KAISHA, Tokyo (JP)

(72) Inventor: Ryoya Kawai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 623 days.

(21) Appl. No.: 17/935,889

(22) Filed: Sep. 27, 2022

(65) Prior Publication Data

US 2023/0102657 A1 Mar. 30, 2023

(30) Foreign Application Priority Data

Sep. 30, 2021 (JP) ................................ 2021-161544

(51) Int. Cl.
*H04W 48/20* (2009.01)
*H04W 12/062* (2021.01)
*H04W 76/10* (2018.01)

(52) U.S. Cl.
CPC ......... *H04W 48/20* (2013.01); *H04W 12/062* (2021.01); *H04W 76/10* (2018.02)

(58) Field of Classification Search
CPC ........................ H04L 12/2807; H04W 12/062; H04W 48/08; H04W 48/20; H04W 76/10; H04W 84/12
See application file for complete search history.

(56) References Cited

U.S. PATENT DOCUMENTS

| | | | | |
|---|---|---|---|---|
| 6,778,828 | B1 * | 8/2004 | Chander | H04W 12/068 455/418 |
| 8,380,168 | B2 * | 2/2013 | Tanaka | A63F 13/12 455/433 |
| 9,686,252 | B2 * | 6/2017 | Brown | H04L 63/0442 |
| 10,593,174 | B1 * | 3/2020 | Yoon | H04L 12/2816 |
| 10,708,959 | B2 * | 7/2020 | Kawaura | G06F 3/1222 |
| 11,178,607 | B2 * | 11/2021 | Kurihara | H04W 48/20 |

(Continued)

FOREIGN PATENT DOCUMENTS

| | | |
|---|---|---|
| CN | 108882338 A | 11/2018 |
| CN | 108882343 A | 11/2018 |

(Continued)

*Primary Examiner* — Dung B Huynh
(74) *Attorney, Agent, or Firm* — Canon U.S.A., Inc. IP Division

(57) ABSTRACT

A method for controlling an information processing apparatus for communicating with a first communication apparatus and a second communication apparatus includes a first acquisition step of acquiring connection information for connecting to an access point from the first communication apparatus; and a first transmission step of transmitting the connection information to the second communication apparatus. The connection information transmitted to the second communication apparatus includes information acquired from the first communication apparatus and information stored in advance in a storage area of the information processing apparatus.

20 Claims, 8 Drawing Sheets

(56) References Cited

U.S. PATENT DOCUMENTS

| | | | | | |
|---|---|---|---|---|---|
| 11,689,385 | B2 * | 6/2023 | Hwang | H04L 12/2809 | 700/275 |
| 11,812,350 | B2 * | 11/2023 | Sagane | H04W 76/14 | |
| 11,836,405 | B2 * | 12/2023 | Shinozuka | G06F 3/1286 | |
| 2007/0189241 | A1 * | 8/2007 | Zhang | H04W 12/06 | 370/338 |
| 2007/0220353 | A1 * | 9/2007 | Iura | G06F 11/0733 | 714/39 |
| 2008/0003946 | A1 * | 1/2008 | Lee | H04W 8/005 | 455/41.2 |
| 2013/0034090 | A1 * | 2/2013 | Thomas | H04W 48/04 | 370/338 |
| 2013/0107806 | A1 * | 5/2013 | Lee | H04N 21/41407 | 370/328 |
| 2013/0265935 | A1 * | 10/2013 | Matsuda | H04L 67/51 | 370/315 |
| 2014/0169221 | A1 * | 6/2014 | Cha | H04W 12/35 | 370/255 |
| 2014/0369232 | A1 * | 12/2014 | Kim | H04W 8/005 | 370/254 |
| 2015/0002884 | A1 * | 1/2015 | Okumura | G06F 3/1204 | 358/1.14 |
| 2015/0046451 | A1 * | 2/2015 | Yamada | G06F 9/44505 | 707/736 |
| 2015/0223068 | A1 * | 8/2015 | Thelen | H04W 12/069 | 726/7 |
| 2015/0327062 | A1 * | 11/2015 | Tatavarty | G06F 21/34 | 726/6 |
| 2015/0327069 | A1 * | 11/2015 | Fu | H04W 76/10 | 726/5 |
| 2015/0373769 | A1 * | 12/2015 | Wang | H04W 76/00 | 455/419 |
| 2015/0382170 | A1 * | 12/2015 | Thota | H04W 8/005 | 455/434 |
| 2016/0011830 | A1 * | 1/2016 | Asakura | H04W 76/10 | 358/1.15 |
| 2016/0014833 | A1 * | 1/2016 | Nakamura | H04L 67/12 | 455/11.1 |
| 2016/0080227 | A1 * | 3/2016 | Kawamori | H04W 12/06 | 370/338 |
| 2016/0241728 | A1 * | 8/2016 | Naruse | G06F 3/1207 | |
| 2016/0291910 | A1 * | 10/2016 | Tanaka | G06K 15/4095 | |
| 2016/0330776 | A1 * | 11/2016 | Ren | H04W 48/08 | |
| 2016/0378411 | A1 * | 12/2016 | Yokoyama | G06F 3/1226 | 358/1.15 |
| 2017/0034859 | A1 * | 2/2017 | Yao | H04W 76/11 | |
| 2017/0041977 | A1 * | 2/2017 | Yokoyama | H04N 1/327 | |
| 2017/0094580 | A1 * | 3/2017 | Sun | H04L 61/256 | |
| 2017/0094694 | A1 * | 3/2017 | Chen | H04W 84/12 | |
| 2017/0111842 | A1 * | 4/2017 | Manroa | H04W 12/06 | |
| 2017/0118653 | A1 * | 4/2017 | Chen | H04W 76/11 | |
| 2017/0127459 | A1 * | 5/2017 | Ye | H04W 12/50 | |
| 2017/0142636 | A1 * | 5/2017 | Joshi | H04W 40/005 | |
| 2017/0202040 | A1 * | 7/2017 | Chatterton | G06Q 20/208 | |
| 2017/0230783 | A1 * | 8/2017 | Toya | H02J 7/02 | |
| 2017/0290071 | A1 * | 10/2017 | Ito | H04W 76/14 | |
| 2017/0308695 | A1 * | 10/2017 | Adams | H04L 63/06 | |
| 2017/0339732 | A1 * | 11/2017 | Matsuyama | H04L 63/06 | |
| 2018/0035480 | A1 * | 2/2018 | Mihira | H04W 68/005 | |
| 2018/0042056 | A1 * | 2/2018 | Hosoda | G06F 3/1204 | |
| 2018/0077494 | A1 * | 3/2018 | Suyama | H04L 41/0803 | |
| 2018/0242148 | A1 * | 8/2018 | Cu | H04L 63/083 | |
| 2018/0263034 | A1 * | 9/2018 | Nagakubo | H04W 40/24 | |
| 2018/0268471 | A1 * | 9/2018 | Slusarczyk | G06T 1/0007 | |
| 2018/0285039 | A1 * | 10/2018 | Kawai | G06F 3/1236 | |
| 2018/0332586 | A1 * | 11/2018 | Takeuchi | H04W 72/0453 | |
| 2018/0332634 | A1 * | 11/2018 | Kawaura | H04W 12/06 | |
| 2018/0335634 | A1 | 11/2018 | Oliveira | | |
| 2018/0359638 | A1 * | 12/2018 | Konji | H04M 1/72412 | |
| 2019/0029069 | A1 * | 1/2019 | Shim | H04W 48/08 | |
| 2019/0050186 | A1 * | 2/2019 | Suga | G06F 3/1292 | |
| 2019/0090294 | A1 * | 3/2019 | An | H04B 7/15 | |
| 2019/0097830 | A1 * | 3/2019 | Ha | H04L 12/2816 | |
| 2019/0132737 | A1 * | 5/2019 | Yu | H04W 12/06 | |
| 2019/0191041 | A1 * | 6/2019 | Ito | H04N 1/00315 | |
| 2019/0199877 | A1 * | 6/2019 | Kato | G06F 3/12 | |
| 2019/0364493 | A1 * | 11/2019 | Yu | H04W 76/18 | |
| 2019/0384537 | A1 * | 12/2019 | Arai | G06F 3/1238 | |
| 2020/0045545 | A1 * | 2/2020 | Sumita | H04W 12/041 | |
| 2020/0045763 | A1 * | 2/2020 | Watanabe | G06F 3/1236 | |
| 2020/0068658 | A1 | 2/2020 | Lee | | |
| 2020/0104081 | A1 * | 4/2020 | Miyake | G06K 7/10722 | |
| 2020/0169953 | A1 * | 5/2020 | Sekiguchi | H04L 63/00 | |
| 2020/0220718 | A1 * | 7/2020 | Tsuji | H04W 48/16 | |
| 2020/0221296 | A1 * | 7/2020 | Jiang | H04L 63/0869 | |
| 2020/0234094 | A1 * | 7/2020 | Kanai | G06K 15/16 | |
| 2020/0280904 | A1 * | 9/2020 | Gao | H04W 48/08 | |
| 2020/0288514 | A1 * | 9/2020 | Uchida | H04W 76/11 | |
| 2020/0305214 | A1 * | 9/2020 | Shibata | H04W 76/18 | |
| 2020/0314742 | A1 * | 10/2020 | Jantzi | H04W 48/20 | |
| 2020/0314743 | A1 * | 10/2020 | Baki | H04W 12/08 | |
| 2020/0319830 | A1 * | 10/2020 | Kaneda | G06F 3/1222 | |
| 2020/0382933 | A1 * | 12/2020 | Ono | H04W 4/80 | |
| 2020/0383036 | A1 * | 12/2020 | Abe | H04W 4/80 | |
| 2020/0389795 | A1 * | 12/2020 | Zhong | H04W 12/50 | |
| 2021/0051141 | A1 * | 2/2021 | Duriseati | H04L 63/0884 | |
| 2021/0084703 | A1 * | 3/2021 | Luo | H04W 76/14 | |
| 2021/0226847 | A1 * | 7/2021 | Jindal | H04L 41/0806 | |
| 2021/0248585 | A1 * | 8/2021 | Kohno | G06Q 20/204 | |
| 2021/0274577 | A1 * | 9/2021 | Kawai | H04W 76/19 | |
| 2021/0282073 | A1 * | 9/2021 | Lee | H04L 41/0856 | |
| 2021/0298099 | A1 * | 9/2021 | Suzuki | H04W 88/06 | |
| 2021/0306521 | A1 * | 9/2021 | Ogawa | H04N 1/00411 | |
| 2021/0306924 | A1 * | 9/2021 | Nishida | H04W 4/80 | |
| 2021/0307087 | A1 * | 9/2021 | Sato | H04W 76/10 | |
| 2021/0314855 | A1 * | 10/2021 | Kim | H04W 48/20 | |
| 2021/0321263 | A1 * | 10/2021 | Boyd | G06Q 50/265 | |
| 2021/0377835 | A1 * | 12/2021 | Yoshida | H04W 8/005 | |
| 2021/0378034 | A1 * | 12/2021 | Shibata | H04W 12/0471 | |
| 2021/0392483 | A1 * | 12/2021 | Otaka | G06F 3/1204 | |
| 2021/0392576 | A1 * | 12/2021 | Ergen | H04M 15/8038 | |
| 2021/0400749 | A1 * | 12/2021 | Asakura | H04W 4/80 | |
| 2022/0021554 | A1 * | 1/2022 | Hwang | H04W 76/10 | |
| 2022/0066712 | A1 * | 3/2022 | Asahara | H04W 76/15 | |
| 2022/0109987 | A1 * | 4/2022 | Zaman | H04W 12/08 | |
| 2022/0334781 | A1 * | 10/2022 | Shinozuka | G06F 3/1286 | |
| 2023/0102657 | A1 * | 3/2023 | Kawai | H04W 76/10 | 358/1.14 |
| 2023/0300615 | A1 * | 9/2023 | Liu | H04W 12/06 | 726/4 |
| 2025/0125988 | A1 * | 4/2025 | Xue | G06F 21/73 | |

FOREIGN PATENT DOCUMENTS

| | | | |
|---|---|---|---|
| CN | 113364492 | A | 9/2021 |
| CN | 113453308 | A | 9/2021 |
| EP | 3402252 | A1 | 11/2018 |
| JP | 2016127545 | A | 7/2016 |
| JP | 2017112586 | A | 6/2017 |
| JP | 2018191252 | A | 11/2018 |
| KR | 20180124764 | A | 11/2018 |

* cited by examiner

FIG. 7

| COMMUNICATION APPARATUS | SSID | PASSWORD |
|---|---|---|
| 151-a | SSID-AP131 | Password-AP131 |
| 151-c | SSID-AP133 | Password-AP133 |

INFORMATION PROCESSING APPARATUS, METHOD FOR CONTROLLING THE SAME, AND STORAGE MEDIUM FOR CONNECTING A COMMUNICATION APPARATUS TO AN ACCESS POINT

BACKGROUND OF THE INVENTION

Field of the Invention

The present invention relates to an information processing apparatus, a method for controlling the same, and a storage medium.

Description of the Related Art

In a known technique, an information processing apparatus such as a personal computer (PC) transmits information on an access point to a communication apparatus such as a printer to connect the communication apparatus to the access point (Japanese Patent Laid-Open No. 2016-127545).

As use of a function for transmitting connection information for connecting to an access point to a communication apparatus to connect the communication apparatus to the access point becomes more widespread, the demand to enhance the usability of the function increases.

SUMMARY OF THE INVENTION

Accordingly, the present invention aims to provide an enhanced usability of a function for connecting a communication apparatus to an access point.

An aspect of the present invention provides a storage medium for causing a computer of an information processing apparatus for communicating with a first communication apparatus and a second communication apparatus to execute a first acquisition step of acquiring connection information for connecting to an access point from the first communication apparatus; and a first transmission step of transmitting the connection information to the second communication apparatus. The connection information transmitted to the second communication apparatus includes information acquired from the first communication apparatus and information stored in advance in a storage area of the information processing apparatus.

Further features of the present invention will become apparent from the following description of exemplary embodiments with reference to the attached drawings.

BRIEF DESCRIPTION OF THE DRAWINGS

FIG. 7 illustrates an example of an access point connection information list acquired in a connection information acquisition process.

DESCRIPTION OF THE EMBODIMENTS

Exemplary embodiments of the present invention will be described hereinafter with reference to the drawings. It should be understood that the following embodiments of the present invention may be changed or improved as appropriate on the basis of the ordinary knowledge of those skilled in the art without departing from the scope of the present invention and such changes or improvements also fall within the scope of the present invention.

First Embodiment

An information processing apparatus and a communication apparatus in a communication system according to a first embodiment of the present invention will be described. In this embodiment, a smartphone is used as a non-limiting example of the information processing apparatus. Other examples of the information processing apparatus include a mobile terminal, a personal computer (PC), a tablet terminal, a personal digital assistant (PDA), and a digital camera. In this embodiment, a printer is used as a non-limiting example of the communication apparatus. The communication apparatus may be any apparatus capable of performing wireless communication with the information processing apparatus. Examples of the printer include an inkjet printer, a full-color laser beam printer, and a monochrome printer. Other examples of the communication apparatus include a copying machine, a facsimile (fax) machine, a mobile terminal, a smartphone, a notebook PC, a tablet terminal, a PDA, a digital camera, a music playback device, a television set, and a smart speaker. The communication apparatus may also be a multi-function peripheral having a plurality of functions such as a copying function, a fax function, and a printing function.

In this embodiment, the information processing apparatus is capable of executing a network setup process for setting up a network for any other device. The setup of a network for any other device is a process for connecting any other device to an access point forming a network. Specifically, the information processing apparatus transmits connection information of the access point to a communication apparatus operating in a network setup mode described below via a wireless fidelity (Wi-Fi) (registered trademark) connection between the communication apparatus and the information processing apparatus. The communication apparatus can connect to the access point by using the received connection information of the access point to connect to the network formed by the access point.

While the network setup process is performed using Wi-Fi communication, the communication method to be used for the network setup process is not limited to Wi-Fi communication. The network setup process may be performed using any other communication method, for example, Bluetooth Low Energy (BLE)), Near Field Communication (NFC), Zigbee, Bluetooth Classic, Wi-Fi Aware, etc.

Figure 1:
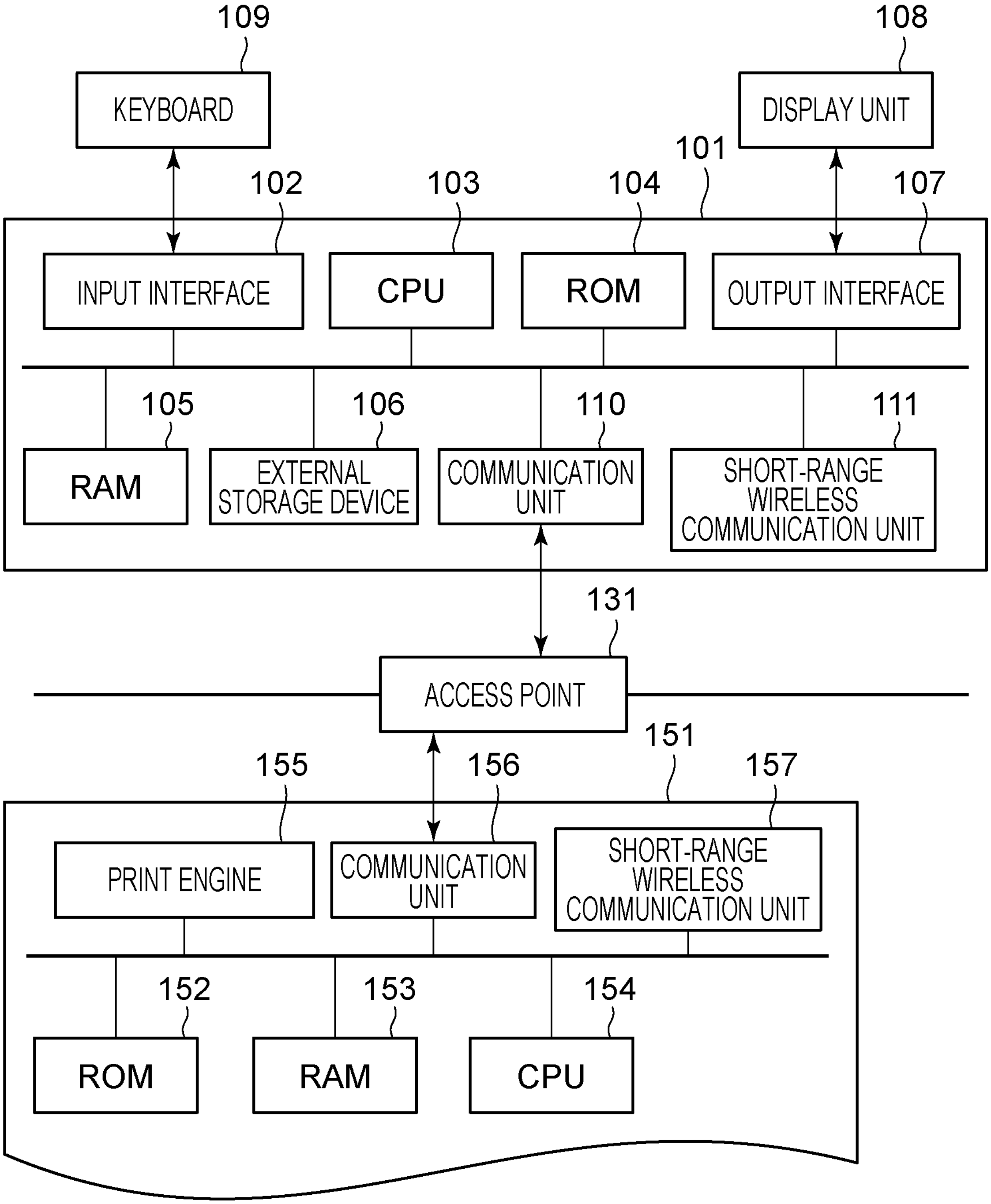
FIG. 1 is a diagram illustrating a configuration of an information processing apparatus, a communication apparatus, and an access point.

First, the configuration of an information processing apparatus according to this embodiment and a communication apparatus capable of communicating with the information processing apparatus according to this embodiment will be described with reference to a block diagram illustrated in FIG. 1. In this embodiment, the following configuration will be described as an example. However, this embodiment is applicable to an apparatus capable of communicating with a communication apparatus, and the functions are not limited to those illustrated in FIG. 1, in particular.

An information processing apparatus 101 is an information processing apparatus according to this embodiment. The information processing apparatus 101 includes an input interface 102, a central processing unit (CPU) 103, a read-only memory (ROM) 104, a random access memory (RAM) 105, an external storage device 106, an output interface 107, a display unit 108, a communication unit 110, and a short-range wireless communication unit 111, for example. The CPU 103, the ROM 104, the RAM 105, and so on form a computer of the information processing apparatus 101.

The input interface 102 is an interface for receiving a data input or an operation instruction from a user operating an operation unit such as a keyboard 109. The operation unit may be a physical keyboard, a physical button, or the like, or may be a soft keyboard, a soft button, or the like displayed on the display unit 108. That is, the input interface 102 may receive an input (operation) from the user via the display unit 108.

The CPU 103 is a system control unit and is configured to control the overall operation of the information processing apparatus 101.

The ROM 104 stores control programs to be executed by the CPU 103, a data table, and fixed data such as a built-in operating system (OS) program. In this embodiment, the control programs stored in the ROM 104 perform software execution control, such as scheduling, task switching, and interrupt processing, under the management of the built-in OS stored in the ROM 104.

The RAM 105 is constituted by a static random access memory (SRAM) or the like that requires backup power supply. The RAM 105, which is configured such that data is held by a primary battery for data backup (not illustrated), is capable of storing important data such as program control variables without volatilization. The RAM 105 has a memory area for storing settings information of the information processing apparatus 101, management data of the information processing apparatus 101, and so on. The RAM 105 is also used as a main memory and a work memory for the CPU 103.

The external storage device 106 stores an application program (hereinafter referred to as a setting application) for setting up a network for a communication apparatus 151, a print information generation program for generating print information interpretable by the communication apparatus 151, and so on. The setting application is an application program for setting an access point (AP) to which the communication apparatus 151 is to be connected. The setting application may have functions other than the network setup function. For example, the setting application may have a function for causing the communication apparatus 151 to perform printing, a function for causing the communication apparatus 151 to scan a document set on the communication apparatus 151, a function for checking the state of the communication apparatus 151, and other functions. The setting application is installed from an external server via the communication unit 110 over Internet communication, for example, and is stored in the external storage device 106. The external storage device 106 stores various programs such as an information transmission and reception control program for transmission and reception between the information processing apparatus 101 and the communication apparatus 151 connected to the information processing apparatus 101 via the communication unit 110, and various types of information used by these programs.

The output interface 107 is an interface that controls the display unit 108 to display data or to notify the user of state of the information processing apparatus 101.

The display unit 108 is constituted by a light-emitting diode (LED), a liquid crystal display (LCD), or the like and is configured to display data or notify the user of the state of the information processing apparatus 101.

The communication unit 110 is configured to connect to an apparatus such as the communication apparatus 151 or an access point 131 to execute data communication. For example, the communication unit 110 is connectable to an access point (not illustrated) in the communication apparatus 151. A connection between the communication unit 110 and the access point in the communication apparatus 151 allows the information processing apparatus 101 and the communication apparatus 151 to communicate with each other. The communication unit 110 may directly communicate with the communication apparatus 151 via wireless communication, or may communicate with the communication apparatus 151 via an external device outside the information processing apparatus 101 and the communication apparatus 151. The external device include an external access point (such as the access point 131) located outside the information processing apparatus 101 and the communication apparatus 151, and a device other than the access point and capable of relaying communication. In this embodiment, the communication unit 110 uses a wireless communication method based on Wi-Fi (registered trademark), which is a communication standard conforming to the Institute of Electrical and Electronics Engineers (IEEE) 802.11 series. The communication unit 110 performs communication to execute the network setup process described above. Examples of the access point 131 include devices such as a wireless local area network (LAN) router. In this embodiment, a method in which the information processing apparatus 101 and the communication apparatus 151 are directly connected to each other without the intervention of an external access point is referred to as a direct connection method. A method in which the information processing apparatus 101 and the communication apparatus 151 are connected to each other via an external access point is referred to as an infrastructure connection method.

The short-range wireless communication unit 111 is configured to wirelessly connect to an apparatus such as the communication apparatus 151 within a short range to execute data communication, and performs communication using a different communication method from that of the communication unit 110. The short-range wireless communication unit 111 is connectable to, for example, a short-range wireless communication unit 157 in the communication apparatus 151. Examples of the communication method include Near Field Communication (NFC), Bluetooth (registered trademark) Classic, BLE, and Wi-Fi Aware.

In this embodiment, the information processing apparatus 101 executes a network setup in accordance with an instruction given by the setting application to execute the network setup process.

The communication apparatus 151 is a communication apparatus according to this embodiment. The communication apparatus 151 includes a ROM 152, a RAM 153, a CPU 154, a print engine 155, a communication unit 156, and the short-range wireless communication unit 157, for example.

The ROM 152, the RAM 153, the CPU 154, and so on form a computer of the communication apparatus 151.

The communication unit 156 includes an access point to be connected to an apparatus such as the information processing apparatus 101. The access point serves as an internal access point of the communication apparatus 151. The access point is connectable to the communication unit 110 of the information processing apparatus 101. The communication unit 156 enables the access point to allow the communication apparatus 151 to operate as an access point. The communication unit 156 may be wirelessly connected directly to the information processing apparatus 101, or may be wirelessly connected to the information processing apparatus 101 via the access point 131. In this embodiment, the communication unit 156 uses a wireless communication method that is a communication standard conforming to the IEEE 802.11 series. In the following description, Wi-Fi (registered trademark) (Wi-Fi communication) is a communication standard conforming to the IEEE 802.11 series. The communication unit 156 performs communication to execute the network setup described above. The communication unit 156 may include hardware functioning as an access point, or may implement software for functioning as an access point to operate as an access point.

The communication apparatus 151 according to this embodiment is capable of operating in an infrastructure mode and a peer-to-peer (P2P) mode as modes for performing communication using the communication unit 156.

The infrastructure mode is a mode in which the communication apparatus 151 communicates with another apparatus such as the information processing apparatus 101 via an external device forming a network (for example, the access point 131). A connection with an external access point, which is established by the communication apparatus 151 operating in the infrastructure mode, is referred to as an infrastructure connection. In this embodiment, in the infrastructure connection, the communication apparatus 151 operates as a slave station, and the external access point operates as a master station. In this embodiment, the master station is an apparatus that determines a communication channel to be used in a network to which the master station belongs, and the slave station is an apparatus that does not determine a communication channel to be used in a network to which the slave station belongs but uses the communication channel determined by the master station.

The P2P mode is a mode in which the communication apparatus 151 directly communicates with another apparatus such as the information processing apparatus 101 without the intervention of an external device forming a network. In this embodiment, the P2P mode includes an AP mode in which the communication apparatus 151 operates as an access point. In the AP mode, the access point in the communication apparatus 151 is enabled, and connection information (a service set identifier (SSID) and a password) of such an access point can be set by the user as desired. The P2P mode may include, for example, a Wi-Fi Direct (WFD) mode for allowing the communication apparatus 151 to perform communication using WFD. Which of a plurality of WFD-enabled devices to operate as a master station is determined in accordance with a sequence called group owner negotiation, for example. The master station may be determined without execution of the group owner negotiation procedure. A device that is a WFD-enabled device and that serves as a master station is referred to as a group owner, in particular. A connection established directly with another apparatus by the communication apparatus 151 operating in the P2P mode is referred to as a direct connection. In this embodiment, in the direct connection, the communication apparatus 151 operates as a master station, and the other apparatus operates as a slave station.

In this embodiment, furthermore, in response to receipt of a predetermined operation from the user, the communication apparatus 151 can operate in a network setup mode. The network setup mode is a mode for setting up a network for the communication apparatus 151. When operating in the network setup mode, the communication apparatus 151 uses the communication unit 156 to operate as an effective setup access point during operation in the network setup mode. The setup access point is an access point different from the access point enabled in the AP mode described above. The SSID of the setup access point includes a predetermined character string recognizable by the setting application of the information processing apparatus 101.

Further, the setup access point is an access point that requires no password for connection. The communication apparatus 151 operating in the network setup mode uses a predetermined communication protocol (setup communication protocol) for communication with the information processing apparatus 101 currently connected to the setup access point. Specific examples of the setup communication protocol include the Simple Network Management Protocol (SNMP). When a predetermined time has elapsed after the communication apparatus 151 started operating in the network setup mode, the communication apparatus 151 stops the operation in the network setup mode and disables the setup access point. As described above, since the setup access point is an access point that requires no password, the setup access point is more likely to be requested by an inappropriate apparatus to connect to the inappropriate apparatus if the setup access point is enabled for a long period of time. The setup access point may be an access point that requires a password. In this case, the password to be used for connection with the setup access point is a fixed password that is known in advance by the setting application and that the user is not allowed to change. When the information processing apparatus 101 supports a function called Wi-Fi Easy Connect (WEC) (registered trademark), the information processing apparatus 101 is capable of implementing the function. WEC is a function of setting up a network for another apparatus by using a device provisioning protocol (DPP) established by the Wi-Fi Alliance. That is, the information processing apparatus 101 may set up a network by using a protocol other than the SNMP. Alternatively, the Hypertext Transfer Protocol (HTTP) or the like may be used, instead of the DPP, as a protocol other than the SNMP.

The short-range wireless communication unit 157 is configured to wirelessly connect to an apparatus such as the information processing apparatus 101 within a short range. In one example, the short-range wireless communication unit 157 is connectable to the short-range wireless communication unit 111 in the information processing apparatus 101. Examples of the communication method used by the short-range wireless communication unit 157 include NFC, Bluetooth Classic, BLE, and Wi-Fi Aware.

The RAM 153 is constituted by an SRAM or the like that requires backup power supply. The RAM 153, which is configured such that data is held by a primary battery for data backup (not illustrated), is capable of storing important data such as program control variables without volatilization. The RAM 153 has a memory area for storing settings information of the communication apparatus 151, management data of the communication apparatus 151, and so on. The RAM 153 is also used as a main memory and a work memory for the CPU 154 and stores various types of information and a receiving buffer for temporarily storing print information received from the information processing apparatus 101 or the like.

The ROM 152 stores control programs to be executed by the CPU 154, a data table, and fixed data such as an OS program. In this embodiment, the control programs stored in the ROM 152 perform software execution control, such as scheduling, task switching, and interrupt processing, under the management of the built-in OS stored in the ROM 152.

The CPU 154 is a system control unit and is configured to control the overall operation of the communication apparatus 151.

The print engine 155 applies a recording material such as ink to a recording medium such as a sheet of paper on the basis of information stored in the RAM 153 in accordance with a print job received from the information processing apparatus 101 or the like to form an image on the recording medium, and outputs the print result. Since the print job transmitted from the information processing apparatus 101 or the like usually has a large amount of data, it is desirable to use a communication method capable of high-speed communication for communication of the print job. Accordingly, the communication apparatus 151 receives the print job via the communication unit 156, which is capable of higher-speed communication than the short-range wireless communication unit 157.

The communication apparatus 151 may have attached thereto a memory such as an external hard disk drive (HDD) or a Secure Digital (SD) card as an optional device, and the information stored in the communication apparatus 151 may be stored in the memory.

Figure 2:
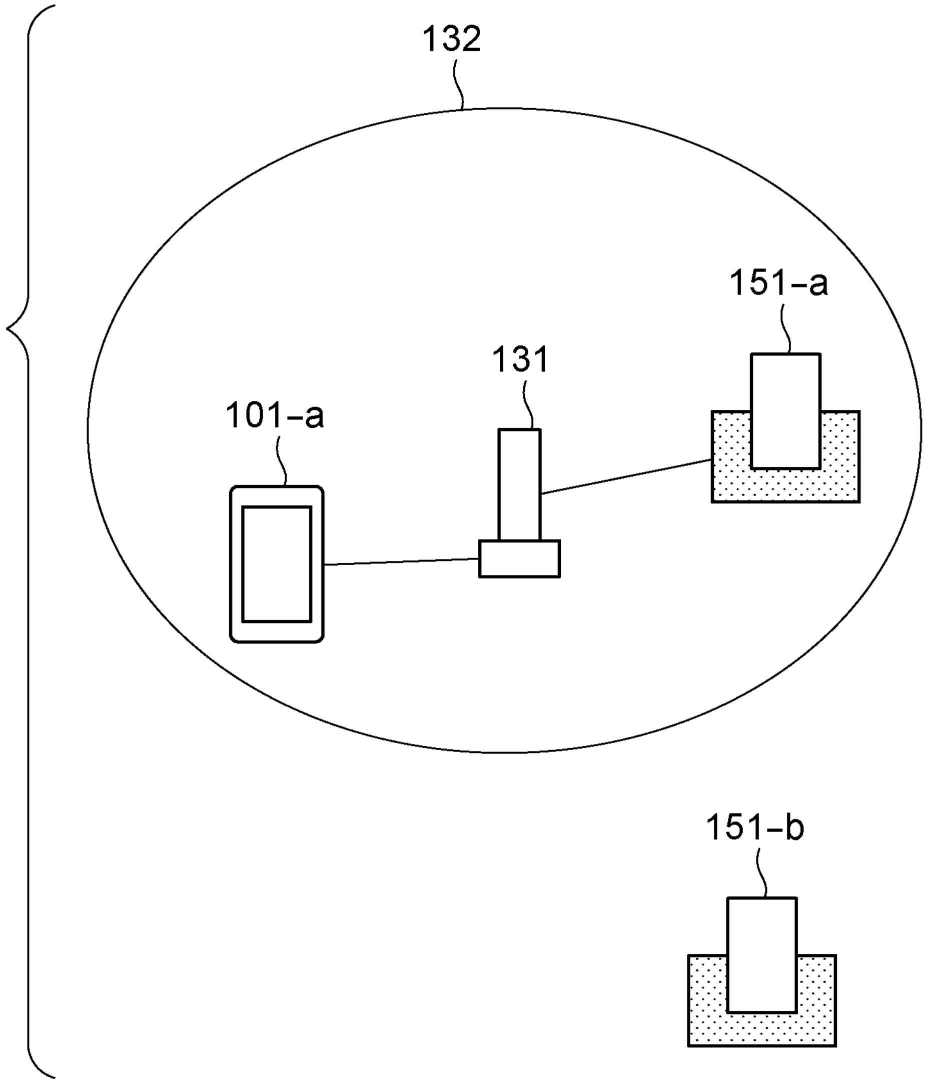
FIG. 2 is a diagram illustrating a network configuration of the information processing apparatus, the communication apparatus, and the access point.

FIG. 2 illustrates a network 132 to which an information processing apparatus 101-*a* and a communication apparatus 151-*a* are connected. The network 132 is formed by the access point (hereinafter referred to as "AP") 131. That is, the information processing apparatus 101-*a* and the communication apparatus 151-*a* are under the infrastructure connection and are capable of communicating with each other. For example, the user purchases a new communication apparatus 151-*b*. In this case, the communication apparatus 151-*b* may also be connected to the network 132 through the execution of the network setup described above. The network setup process may request an operation for setting up a network (for example, request the user to input a password or select an AP) to improve security. As described above, each time a new communication apparatus is connected to a network, the network setup for the new communication apparatus is required.

Accordingly, in this embodiment, the information processing apparatus 101-*a* executes a connection information acquisition process to acquire connection information of the AP 131 including an SSID and a password from the communication apparatus 151-*a*, which has been connected to the network 132. Even if the information processing apparatus 101-*a* has been connected to the network 132, the information processing apparatus 101-*a* acquires the connection information from the communication apparatus 151-*a* because the setting application is not capable of acquiring a password for connecting to the network 132 from the OS of the information processing apparatus 101-*a*. The acquired connection information of the AP 131 is transmitted to the communication apparatus 151-*b* when the network setup for the communication apparatus 151-*b* is executed. This enables the user to connect the communication apparatus 151-*b* to the AP 131 (the network 132) without selecting an AP or inputting a password when the network setup for the communication apparatus 151-*b* is executed. Further, connection information for connecting the communication apparatus 151-*b* to the network 132 can be handed over to the communication apparatus 151-*b*. As a result, the usability can be improved.

Figure 3:
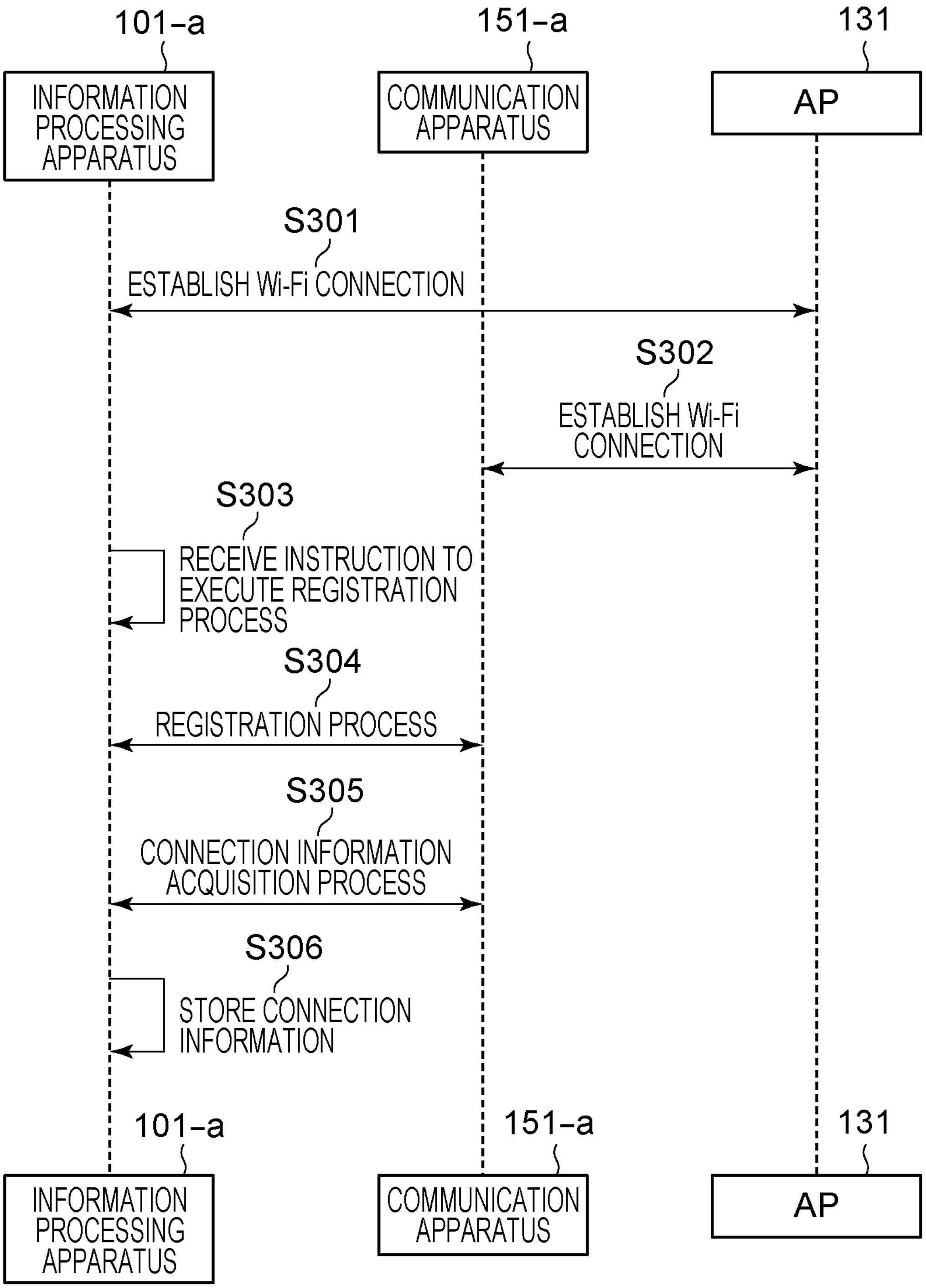
FIG. 3 is a sequence diagram illustrating processes performed by the information processing apparatus and the communication apparatus.

FIG. 3 is a sequence diagram illustrating processes executed by the information processing apparatus 101-*a* and the communication apparatus 151-*a* for the execution of the connection information acquisition process. The processes illustrated in the sequence diagram in FIG. 3 are implemented by, for example, the CPU 103 of the information processing apparatus 101-*a* reading a program of the setting application stored in the memory of the information processing apparatus 101-*a* into the RAM 105 of the information processing apparatus 101-*a* and executing the program.

First, in S301, the information processing apparatus 101-*a* establishes a Wi-Fi connection with the AP 131.

Then, in S302, the communication apparatus 151-*a* establishes a Wi-Fi connection with the AP 131. The communication apparatus 151-*a* may establish a Wi-Fi connection with the AP 131 through the execution of the network setup process described above. Alternatively, the communication apparatus 151-*a* may establish a Wi-Fi connection with the AP 131 in response to a predetermined operation performed on the communication apparatus 151-*a* for establishing a Wi-Fi connection between the communication apparatus 151-*a* and the AP 131.

Then, in S303, the information processing apparatus 101-*a* receives an instruction from the user by using the setting application to execute a process for registering the communication apparatus 151-*a*.

Then, in S304, the information processing apparatus 101-*a* searches for one or more communication apparatuses 151 on the network to which the information processing apparatus 101-*a* belongs (i.e., the network formed by the AP 131). Upon receiving information indicating a response(s) from the one or more communication apparatuses 151, the information processing apparatus 101-*a* determines that the one or more communication apparatuses 151 have been found. Then, the information processing apparatus 101-*a* displays a list of the found one or more communication apparatuses 151 on the display unit 108. Here, it is assumed that only the communication apparatus 151-*a* is found. The information processing apparatus 101-*a* executes a process for registering the communication apparatus 151-*a* in response to the user selecting information on the communication apparatus 151-*a* displayed on the display unit 108. Specifically, the information processing apparatus 101-*a* sends a request for capability information to the communication apparatus 151-*a*, and the communication apparatus 151-*a* transmits the capability information to the information processing apparatus 101-*a*. Accordingly, the information on the communication apparatus 151-*a* is registered on the setting application, and thereafter the setting application enables execution of communication with the communication apparatus 151-*a*. The capability information of the communication apparatus 151-*a* includes various types of information related to the communication apparatus 151-*a*, such as the name and media access control (MAC) address of the communication apparatus 151-*a*. The capability information of the communication apparatus 151-*a* further includes, for example, print-settings related information such as a sheet size and a sheet type that are supported by the communication apparatus 151-*a*, and print settings (edge setting and double-sided setting) that are supported by the communication apparatus 151-*a*.

Then, in S305, the information processing apparatus 101-*a* executes a connection information acquisition process.

That is, the information processor 101-*a* acquires the connection information of the AP 131 from the communication apparatus 151-*a*. The connection information includes an SSID name (SSID) of the AP 131, a password (authentication information) of the AP 131, and an encryption method of the AP 131. The connection information includes at least the password. The connection information is not limited to that described above, and may include information on frequencies used by the AP 131 and information on channels used by the AP 131. Upon successful acquisition of the SSID name and the encryption method of the AP 131, the information processing apparatus 101-*a* may acquire the password in accordance with the acquired encryption method. Specifically, the information processing apparatus 101-*a* may determine whether the acquired encryption method supports the network setup process. If the encryption method supports the network setup process, the information processing apparatus 101-*a* may provide a notification (display) to prompt the user to select whether to acquire the password.

The information processing apparatus 101-*a* may acquire the password from the communication apparatus 151-*a* in response to the user inputting an instruction to acquire the password. As a result of determining whether the acquired encryption method supports the network setup process, if the encryption method does not support the network setup process, the information processing apparatus 101-*a* does not need to provide a notification (display) to prompt the user to select whether to acquire the password. Examples of the encryption method supporting the network setup process include Wi-Fi Protected Access 2 (WPA2) and Wired Equivalent Privacy (WEP). Examples of the encryption method not supporting the network setup process include WPA2 Enterprise. Alternatively, the information processing apparatus 101-*a* may compare the newly acquired connection information with the stored connection information and acquire the password only when the newly acquired connection information and the stored connection information are different. Alternatively, the information processing apparatus 101-*a* may determine whether the information processing apparatus 101-*a* is communicating with the communication apparatus 151-*a* via a network different from the network used for the previous communication with the communication apparatus 151-*a*, and may acquire (update) the connection information if the network used for the current communication is different from the network used for the previous communication.

Then, in S306, the information processing apparatus 101-*a* saves (or stores) the connection information acquired from the communication apparatus 151-*a* in the ROM 104 of the information processing apparatus 101-*a*. At this time, the SSID name and the password may be encrypted and then stored. If the connection information has already been stored, the stored connection information is overwritten with the newly acquired connection information. Alternatively, the information processing apparatus 101-*a* may compare the stored connection information with the newly acquired connection information and overwrite the stored connection information with the newly acquired connection information if the stored connection information is determined to be different from the newly acquired connection information. In one example, in S305, the information processing apparatus 101-*a* determines whether the acquired encryption method supports the network setup process, and the acquired SSID and encryption method are not stored if the encryption method does not support the network setup process.

The time at which the connection information acquisition process for acquiring the connection information of the AP 131 is executed is not limited to the time at which the process for registering the communication apparatus 151-*a* in the setting application is executed, and the connection information acquisition process may be executed at any time at which communication with the communication apparatus 151-*a* is possible. For example, when the setting application has a print function or a scan function, the connection information acquisition process may be executed at a time such as when a print job is executed or when a scan job is executed. This increases the frequency with which the connection information acquisition process is executed, and enables the latest connection information to be stored in the ROM 104 of the information processing apparatus 101-*a*. In addition, even if failure or the like in the communication apparatus 151-*a* causes difficulty in communication, the connection information can be acquired at a time at which communication is possible. This ensures that the connection information can be acquired more reliably.

Figure 4:
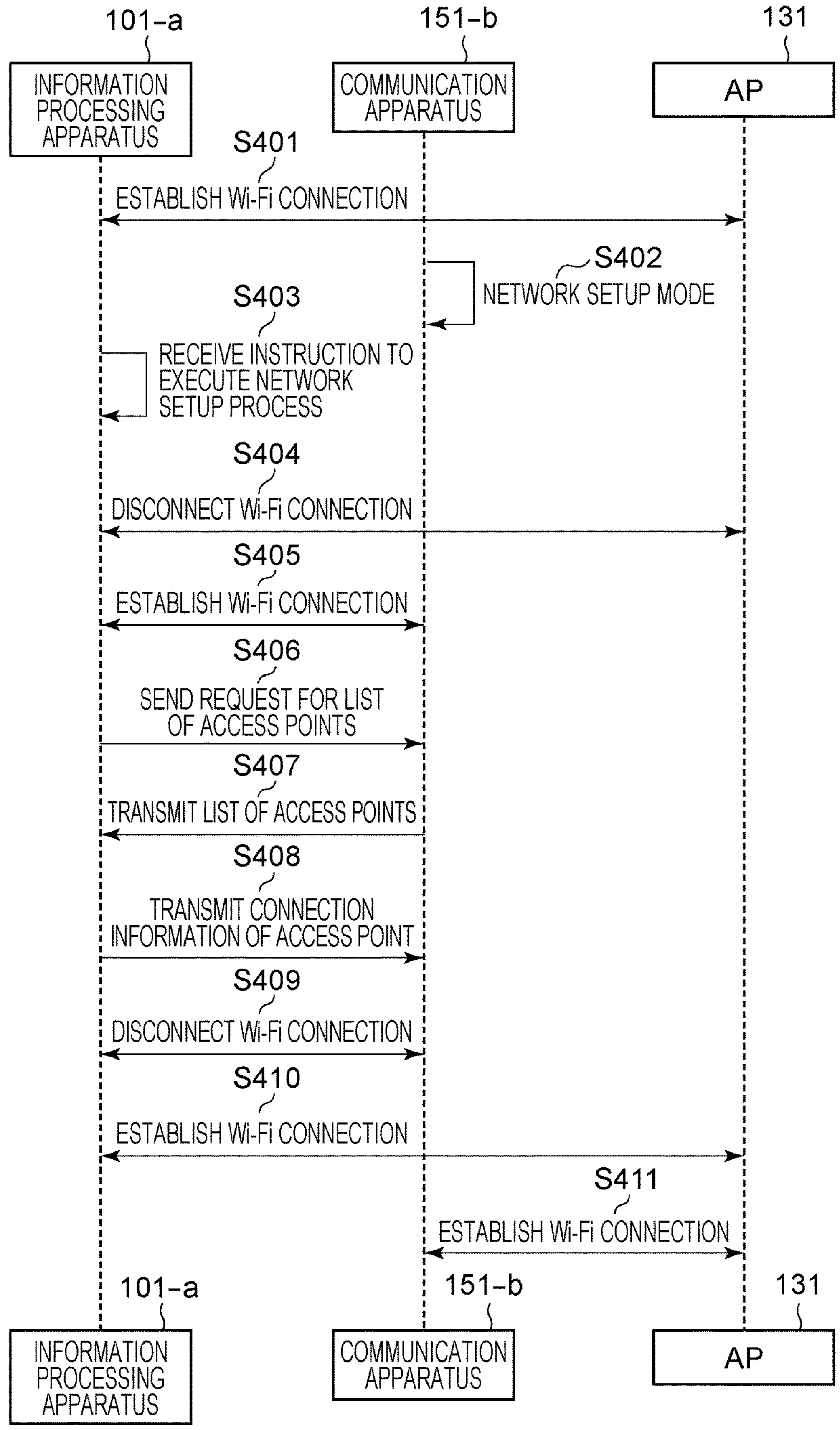
FIG. 4 is a sequence diagram illustrating processes performed by the information processing apparatus and the communication apparatus.

Next, the network setup process executed by the information processing apparatus 101-*a* and the communication apparatus 151-*b* will be described with reference to FIGS. 2 and 4. A sequence illustrated in FIG. 4 is implemented by, for example, the CPU 103 of the information processing apparatus 101-*a* reading a program of a setting application stored in the ROM 104 of the information processing apparatus 101-*a*, an external storage device, or the like into the RAM 105 of the information processing apparatus 101-*a* and executing the program. As described above, the setup communication protocol is used for communication via a Wi-Fi connection between the information processing apparatus 101-*a* and the communication apparatus 151-*b* operating in the network setup mode. In FIG. 2, it is assumed that the information processing apparatus 101-*a* stores the connection information of the AP 131, which has been acquired from the communication apparatus 151-*a* through the connection information acquisition process described above. When the network setup for the communication apparatus 151-*b* is executed, the communication apparatus 151-*a* may not reside in the network 132 (or is not connecting to the AP 131).

In S401, the information processing apparatus 101-*a* establishes a Wi-Fi connection with the AP 131. The information processing apparatus 101-*a* may establish a Wi-Fi connection with an AP different from the AP 131.

In S402, the communication apparatus 151-*b* starts operating in the network setup mode described above. The operation in the network setup mode is started in response to power being turned on to the communication apparatus 151-*b* through a power-on operation before the initial setting of the communication apparatus 151-*b* is completed. Alternatively, the operation in the network setup mode is started in response to a predetermined operation for a network setup being performed on the communication apparatus 151-*b* after power has been turned on.

In S403, the information processing apparatus 101-*a* receives a predetermined operation for a network setup (hereinafter referred to as a setting operation) on a screen displayed by the setting application. The setting operation is an operation different from the operation of providing an instruction to execute the process for registering the communication apparatus 151-*a*, which is an operation in which the connection information acquisition process described with reference to FIG. 3 is executed. Then, the information processing apparatus 101-*a* acquires information on an access point to which the information processing apparatus 101-*a* is being wirelessly connected via Wi-Fi when at least the setting operation is performed. This access point is hereinafter referred to as a connected AP. In this embodiment, the information processing apparatus 101-*a* has not switched the connection-destination access point after the setting operation was performed. Thus, the access point (i.e., the connected AP) is also the access point to which the information processing apparatus 101-*a* is connected in S403. The acquired information includes information (such as information indicating the SSID and the encryption method) for connecting to the access point to which the information processing apparatus 101-*a* is being wirelessly connected via Wi-Fi. The acquired information is stored in a predetermined storage area of the memory of the information processing apparatus 101-*a*. This processing is omitted if the information processing apparatus 101-*a* is not being connected to any access point via Wi-Fi when the setting operation is performed. While the connected AP is the AP 131 in FIG. 2, the connected AP may be an AP different from the AP 131.

In S404, the information processing apparatus 101-*a* disconnects the Wi-Fi connection with the connected AP.

In S405, the information processing apparatus 101-*a* establishes a Wi-Fi connection with the communication apparatus 151-*b*. Specifically, the CPU 103 of the information processing apparatus 101-*a* instructs the OS of the information processing apparatus 101-*a* to search for an access point near the information processing apparatus 101-*a*, and acquires the search result by using the setting application. Then, the CPU 103 determines whether the acquired search result includes an access point enabled by the communication apparatus 151-*b* operating in the network setup mode. As described above, in this embodiment, the SSID of the access point enabled by the communication apparatus 151-*b* operating in the network setup mode includes a predetermined character string recognized in advance by the setting application. Accordingly, in this determination, specifically, the CPU 103 determines whether the acquired search result includes an access point having an SSID including the predetermined character string. If YES is determined, the CPU 103 of the information processing apparatus 101-*a* attempts to establish a Wi-Fi connection between the information processing apparatus 101-*a* and the access point included in the search result and enabled by the communication apparatus 151-*b* operating in the network setup mode. The Wi-Fi connection corresponds to a Wi-Fi connection between the information processing apparatus 101-*a* and the communication apparatus 151-*b* operating in the network setup mode.

In S406, the information processing apparatus 101-*a* sends a request for a list of access points to the communication apparatus 151-*b* via the Wi-Fi connection between the information processing apparatus 101-*a* and the communication apparatus 151-*b* operating in the network setup mode by using the setting application.

Then, in S407, the communication apparatus 151-*b* transmits the list of access points to the information processing apparatus 101-*a* via the Wi-Fi connection between the information processing apparatus 101-*a* and the communication apparatus 151-*b* operating in the network setup mode. The transmitted list is a list indicating one or more access points to which the communication apparatus 151-*b* is connectable. The one or more access points are found by the communication apparatus 151-*b* executing an AP search.

Then, in S408, the information processing apparatus 101-*a* transmits connection information of any one of the access points included in the received list to the communication apparatus 151-*b* via the Wi-Fi connection between the information processing apparatus 101-*a* and the communication apparatus 151-*b* operating in the network setup mode. This processing is implemented by the setting application controlling the information processing apparatus 101-*a* to transmit connection information of any one of the access points included in the received list. Details of the processing of S408 will be described below with reference to FIG. 5. The communication apparatus 151-*b* may notify the information processing apparatus 101-*a* that the connection information has been received via the Wi-Fi connection between the information processing apparatus 101-*a* and the communication apparatus 151-*b* operating in the network setup mode.

In S409, the information processing apparatus 101-*a* disconnects the Wi-Fi connection between the information processing apparatus 101-*a* and the access point enabled by the communication apparatus 151-*b* operating in the network setup mode.

In S410, the information processing apparatus 101-*a* re-establishes a connection with the connected AP by using the stored connection information. The present invention is not limited to this embodiment. In one example, if the information processing apparatus 101-*a* has transmitted connection information of an access point different from the connected AP to the communication apparatus 151-*b*, the information processing apparatus 101-*a* may connect to the access point different from the connected AP. For example, when the connection information of the AP corresponding to the connection information acquired in the connection information acquisition process is transmitted to the communication apparatus 151-*b* in S408, the AP may be an AP different from the connected AP. In this case, the information processing apparatus 101-*a* may connect to the AP corresponding to the connection information acquired in the connection information acquisition process. In another example, if the information processing apparatus 101-*a* has transmitted connection information of an access point selected by the user to the communication apparatus 151-*b*, the information processing apparatus 101-*a* connects to the selected access point. This enables the information processing apparatus 101-*a* to communicate with the communication apparatus 151-*b* via the network formed by the connected access point.

In S411, the communication apparatus 151-*b* terminates the operation in the network setup mode and transitions to the infrastructure mode. Then, the communication apparatus 151-*b* uses the connection information acquired in S408 to attempt a connection to the access point corresponding to the connection information. After the connection is successful, the communication apparatus 151-*b* is allowed to perform communication via the network formed by the connected access point.

Thereafter, the information processing apparatus 101-*a* may search for the communication apparatus 151-*b* on the network to which the information processing apparatus 101-*a* belongs by using the setting application. In response to the communication apparatus 151-*b* being found, the information processing apparatus 101-*a* sends a request for capability information to the communication apparatus 151-*b*, and the communication apparatus 151-*b* transmits the capability information to the information processing apparatus 101-*a*. That is, the information processing apparatus 101-*a* may execute the process for registering the communication apparatus 151-*b*. Accordingly, information on the communication apparatus 151-*b* is registered on the setting application, and thereafter the setting application enables the information processing apparatus 101-*a* to communicate with the communication apparatus 151-*b*. Specifically, for example, the setting application enables the information processing apparatus 101-*a* to transmit a print job to the communication apparatus 151-*b*. At this time, if the information processing apparatus 101-*a* belongs to a network formed by the access point to which the communication apparatus 151-*b* is connected through the network setup, the information processing apparatus 101-*a* is allowed to communicate with the communication apparatus 151-*b* via the access point. In one example, the process for registering the communication apparatus 151-*b* includes an addition process and a replacement process. The addition process is a process for newly connecting the purchased communication apparatus 151-*b* to the network 132 while keeping the communication apparatus 151-*a*, which has been connected to the network 132, connected to the network 132. In other words, the addition process is a process for enabling new communication between the information processing apparatus 101-*a* and the communication apparatus 151-*b* while maintaining the communication between the information processing apparatus 101-*a* and the communication apparatus 151-*a*. The replacement process is a process for disconnecting the communication apparatus 151-*a*, which has been connected to the network 132, from the network 132 and connecting the purchased communication apparatus 151-*b* instead of the communication apparatus 151-*a* to the network 132. In other words, the replacement process is a process for releasing the communication between the information processing apparatus 101-*a* and the communication apparatus 151-*a* and enabling new communication between the information processing apparatus 101-*a* and the communication apparatus 151-*b*. Accordingly, in a state in which registration information of the communication apparatus 151-*a* has been stored in the setting application, an object indicating the addition process for the communication apparatus 151-*b* and an object indicating the replacement process for the communication apparatus 151-*b* may be displayed on an operation screen for giving an instruction to execute the process for registering the communication apparatus 151-*b*. The operation screen may prompt the user to select which of the addition process for the communication apparatus 151-*b* and the replacement process for the communication apparatus 151-*b* is to be executed. Then, the processing of S401 to S411 is executed in response to, for example, the operation of any one of the objects. In response to the operation of the object indicating the addition process for the communication apparatus 151-*b*, then, in the registration process, registration information of the communication apparatus 151-*b* may be newly stored in the setting application in addition to the registration information of the communication apparatus 151-*a* stored in the setting application. In response to the operation of the object indicating the replacement process for the communication apparatus 151-*b*, then, in the registration process, the registration information of the communication apparatus 151-*a* stored in the setting application may be deleted and registration information of the communication apparatus 151-*b* may be newly stored in the setting application, for example. The objects described above need not be displayed if the setting application does not store registration information of any communication apparatus 151 and the purchased communication apparatus 151-*b* is the communication apparatus 151 that is first connected to the network 132. Alternatively, the objects may be displayed regardless of whether the setting application stores registration information of one or more communication apparatuses 151, and the registration information of the communication apparatus 151-*b* may be stored regardless of which object is selected. Alternatively, either one of the objects may be displayed. In one example, if the setting application does not store registration information of any communication apparatus 151, the object indicating the addition process is displayed, and the object indicating the replacement process is not displayed. In this example, the object indicating the replacement process may be displayed in such a manner that the operation of the object indicating the replacement process is disabled. If communication is not available between the information processing apparatus 101-*a* and the communication apparatus 151-*b*, the request or acquisition of the capability information is omitted. For example, if the access point to which the communication apparatus 151-*b* is connected is different from the access point to which the information processing apparatus 101-*a* is being connected, the request or acquisition of the capability information is omitted. The objects described above may be displayed at a time other than the time described above, for example, when the information processing apparatus 101-*a* receives the capability information. In response to the selection of one of the displayed objects, the corresponding one of the addition process and the replacement process may be executed.

Figure 5:
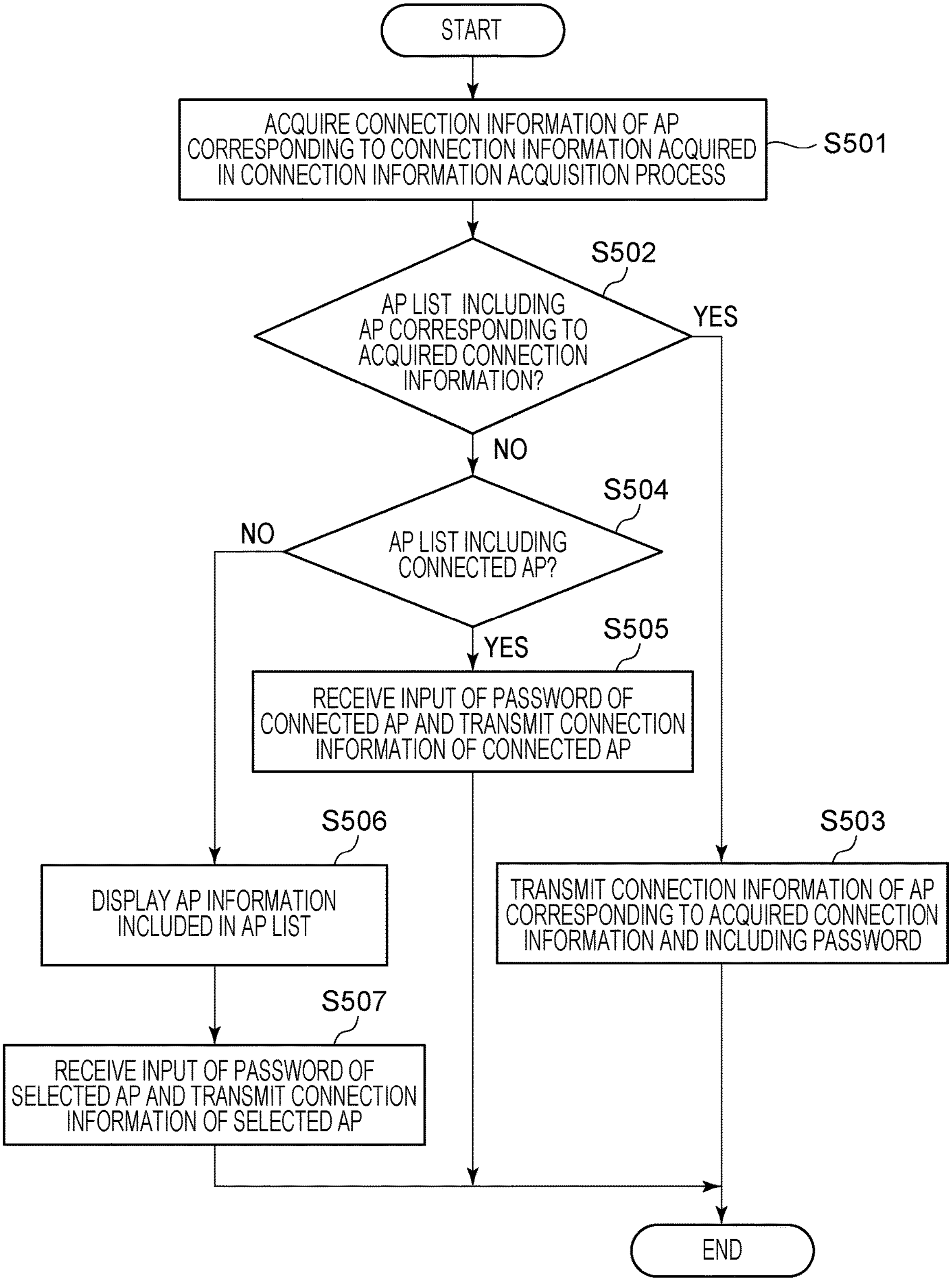
FIG. 5 is a flowchart illustrating a process performed by the information processing apparatus.

FIG. 5 is a flowchart illustrating details of the process executed by the information processing apparatus 101-*a* in S408 of the network setup process illustrated in FIG. 4. The flowchart illustrated in FIG. 5 is implemented by, for example, the CPU 103 reading the setting application stored in the ROM 104, the external storage device 106, or the like into the RAM 105 and executing the setting application.

In S501, the CPU 103 acquires the connection information of the AP 131, which is acquired from the communication apparatus 151-*a* in the connection information acquisition process and stored, from the ROM 104 of the information processing apparatus 101-*a*.

In S502, the CPU 103 determines whether the list of access points, which is acquired from the communication apparatus 151-*b* in S407, includes the AP 131 corresponding to the connection information acquired in S501. Specifically, since the list of access points, which is acquired from the communication apparatus 151-*b*, includes information on access points, the CPU 103 determines whether the list of access points includes the SSID of the AP 131 corresponding to the connection information acquired in S501. The determination may be based on, instead of the SSID, information indicating the same standard or the same encryption method. If the CPU 103 determines YES in S502, the process proceeds to S503. If the CPU 103 determines NO in S502, the process proceeds to S504.

In S503, the CPU 103 transmits the connection information of the AP 131 acquired from the communication apparatus 151-*a* in the connection information acquisition process described above and including the password to the communication apparatus 151-*b*. When the process proceeds to S503, no password input is accepted from the user. The connection information acquired from the communication apparatus 151-*a* in the connection information acquisition process and transmitted to the communication apparatus 151-*b* includes information other than the password, and the information other than the password may be information stored in advance in the information processing apparatus 101-*a*. In one example, instead of the SSID name acquired from the communication apparatus 151-*a* in the connection information acquisition process, the SSID name of the AP, which is acquired in advance by the information processing apparatus 101-*a*, may be transmitted to the communication apparatus 151-*b*. The processing of S503 corresponds to the processing of S408 in FIG. 4.

In S504, the CPU 103 determines whether the list of access points, which is acquired from the communication apparatus 151-*b* in S407, includes the connected AP. If the CPU 103 determines YES in S504, the process proceeds to S505. If the CPU 103 determines NO in S504, the process proceeds to S506. In this embodiment, the list includes only the access points found by the search performed by the communication apparatus 151-*b*. Accordingly, if the received list includes the connected AP, this means that the communication apparatus 151-*b* is connectable to the connected AP. If the received list does not include the connected AP, this means that the communication apparatus 151-*b* is not connectable to the connected AP. An access point connectable by using an encryption method not supported by the communication apparatus 151-*b* is not included in the list because the communication apparatus 151-*b* is not connectable to such an access point. Further, an access point connectable in a frequency band not supported by the communication apparatus 151-*b* is not included in the list because the communication apparatus 151-*b* is not connectable to such an access point. Accordingly, connection information of an access point different from the connected AP is transmitted to the communication apparatus 151-*b*.

In S505, the CPU 103 causes the display unit 108 to display a screen for receiving an input of the password of the connected AP from the user, and, upon receipt of an input of the password from the user, the CPU 103 transmits connection information of the connected AP including the password to the communication apparatus 151-*b*. The processing of S505 corresponds to the processing of S408 in FIG. 4.

In S506, the CPU 103 causes the display unit 108 to display the list received from the communication apparatus 151-*b* in S407, and receives selection of any access point in the list from the user.

In S507, the CPU 103 receives an operation of inputting the password of the access point selected in S506 from the user through the display unit 108 or the like, and transmits connection information of the selected access point including the password to the communication apparatus 151-*b*. The processing of S507 corresponds to the processing of The processing operations in the flowchart described above are not limited to those described above.

In one example, if NO is determined in S504, the list may always be displayed and selection of an access point may be received from the user every time. In another example, if NO is determined in S504, the connection information of the access point may not be transmitted. Further, the information processing apparatus 101-*a* may not attempt to establish a connection between the communication apparatus 151-*b* and the access point. In this example, connection information of an access point enabled in the communication apparatus 151-*b* in the AP mode may be received from the communication apparatus 151-*b*, and an attempt may be made to establish a connection between the information processing apparatus 101-*a* and the communication apparatus 151-*b* operating in the AP mode. In this example, after transmitting connection information of the access point enabled in the communication apparatus 151-*b* in the AP mode, the communication apparatus 151-*b* completes the network setup mode and transitions to the AP mode.

If NO is determined in S502, the communication apparatus 151-*b* is to be connected to an AP different from the AP 131 corresponding to the connection information acquired by the information processing apparatus 101-*a* in the connection information acquisition process. In this case, the CPU 103 establishes a connection with the AP to which the communication apparatus 151-*b* is connected in S410, and communicates with the communication apparatus 151-*b*. Then, the CPU 103 may acquire the connection information of the AP to which the communication apparatus 151-*b* is connected from the communication apparatus 151-*b* and update (or store) the stored connection information. That is, after that, to execute a network setup for a communication apparatus 151-*c*, the connection information acquired from the communication apparatus 151-*b* is transmitted.

If the CPU 103 fails to acquire the connection information of the AP 131 from the ROM 104 of the information processing apparatus 101-*a* in S501, the process may proceed to S504. The CPU 103 fails to acquire the connection information of the AP 131 when, for example, the encryption method acquired by the information processing apparatus 101-*a* in the connection information acquisition process is an encryption method not supporting the network setup process and the connection information of the AP 131 has not been stored.

As described above, in this embodiment, in the connection information acquisition process, the CPU 103 acquires the connection information of the AP 131 from the communication apparatus 151-*a* connected to the network formed by the AP 131. When executing a network setup for the communication apparatus 151-*b* for which the user desires to set up a network, the CPU 103 transmits the connection information of the AP 131 acquired in the connection information acquisition process and including the password to the communication apparatus 151-*b*. This enables the user to connect the communication apparatus 151-*b* to the AP 131 (the network 132) without selecting an AP or inputting a password when executing the network setup for the communication apparatus 151-*b*. Further, connection information for connecting the communication apparatus 151-*b* to the network 132 can be handed over to the communication apparatus 151-*b*. As a result, the usability can be improved. Further, the connection information of the AP 131 is acquired from the communication apparatus 151-*a* connected to the network formed by the AP 131, which makes it possible to acquire more reliable connection information.

Second Embodiment

In the first embodiment, the connection information of one AP, namely, the AP 131, which is acquired from the communication apparatus 151-*a* in the connection information acquisition process, is stored.

In a second embodiment, in response to the connection information acquisition process being performed on a plurality of communication apparatuses, connection information of a plurality of APs is acquired and stored. The following description will be given focusing on differences from the first embodiment.

Figure 6:
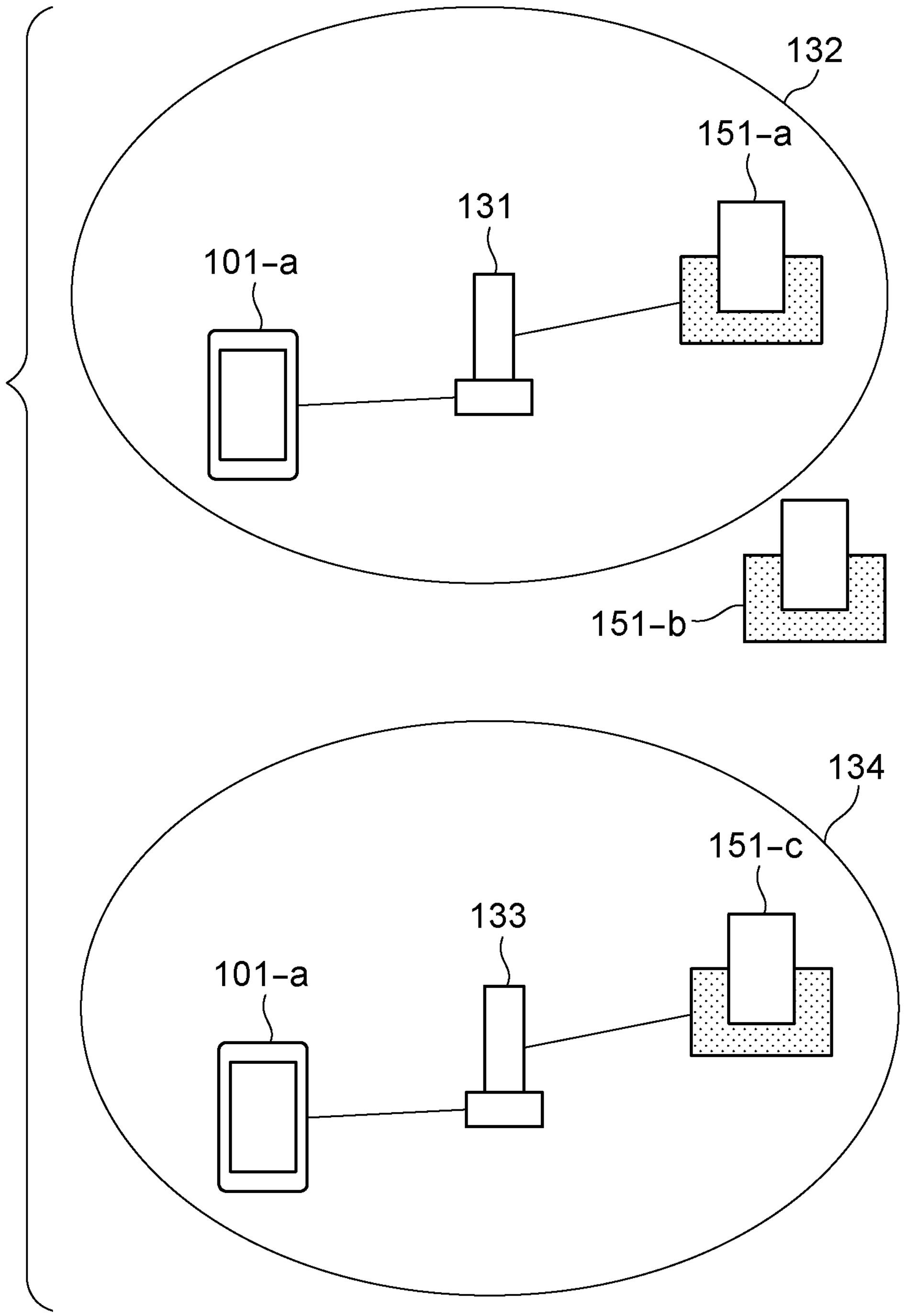
FIG. 6 is a diagram illustrating a network configuration of the information processing apparatus, the communication apparatus, and the access point.

FIG. 6 illustrates a network 132 to which an information processing apparatus 101-*a* and a communication apparatus 151-*a* are connected. The network 132 is formed by an AP 131. FIG. 6 also illustrates a network 134 to which an information processing apparatus 101-*a* and a communication apparatus 151-*c* are connected. The network 134 is formed by an AP 133. A communication apparatus 151-*b* is not being connected to the network 132 or the network 134. Further, it is assumed that the information processing apparatus 101-*a* stores the connection information of the AP 131, which has been acquired from the communication apparatus 151-*a* through the connection information acquisition process described above. It is also assumed that the information processing apparatus 101-*a* stores connection information of the AP 133, which has been acquired from the communication apparatus 151-*c*. When the network setup for the communication apparatus 151-*b* is executed, the communication apparatuses 151-*a* and 151-*c* may not reside on the networks 132 and 134, respectively.

FIG. 7 illustrates an example of an access point connection information list (hereinafter referred to as an AP connection information list) acquired in the connection information acquisition process. As in S305 of the sequence illustrated in FIG. 3, The CPU 103 acquires connection information of the AP 131 from the communication apparatus 151-*a*. The CPU 103 further acquires the connection information of the AP 133 from the communication apparatus 151-*c*. In one example, the ROM 104 of the information processing apparatus 101-*a* stores at least the printer name of a communication apparatus from which connection information of an AP is transmitted, and the SSID name and the password of the AP in association with each other. The ROM 104 of the information processing apparatus 101-*a* may also store other information on the AP in association with the information described above. Alternatively, the information processing apparatus 101-*a* may compare newly acquired connection information with the stored connection information and store the newly acquired connection information only when the newly acquired connection information and the stored connection information are different. Alternatively, the information processing apparatus 101-*a* may determine whether the information processing apparatus 101-*a* is communicating with the communication apparatus 151-*a* via a network different from the network used for the previous communication with the communication apparatus 151-*a*, and may acquire (update) the connection information if the network used for the current communication is different from the network used for the previous communication. Likewise, the information processing apparatus 101-*a* may determine whether the information processing apparatus 101-*a* is communicating with the communication apparatus 151-*c* via a network different from the network used for the previous communication with the communication apparatus 151-*c*, and may acquire (update) the connection information if the network used for the current communication is different from the network used for the previous communication.

Figure 8:
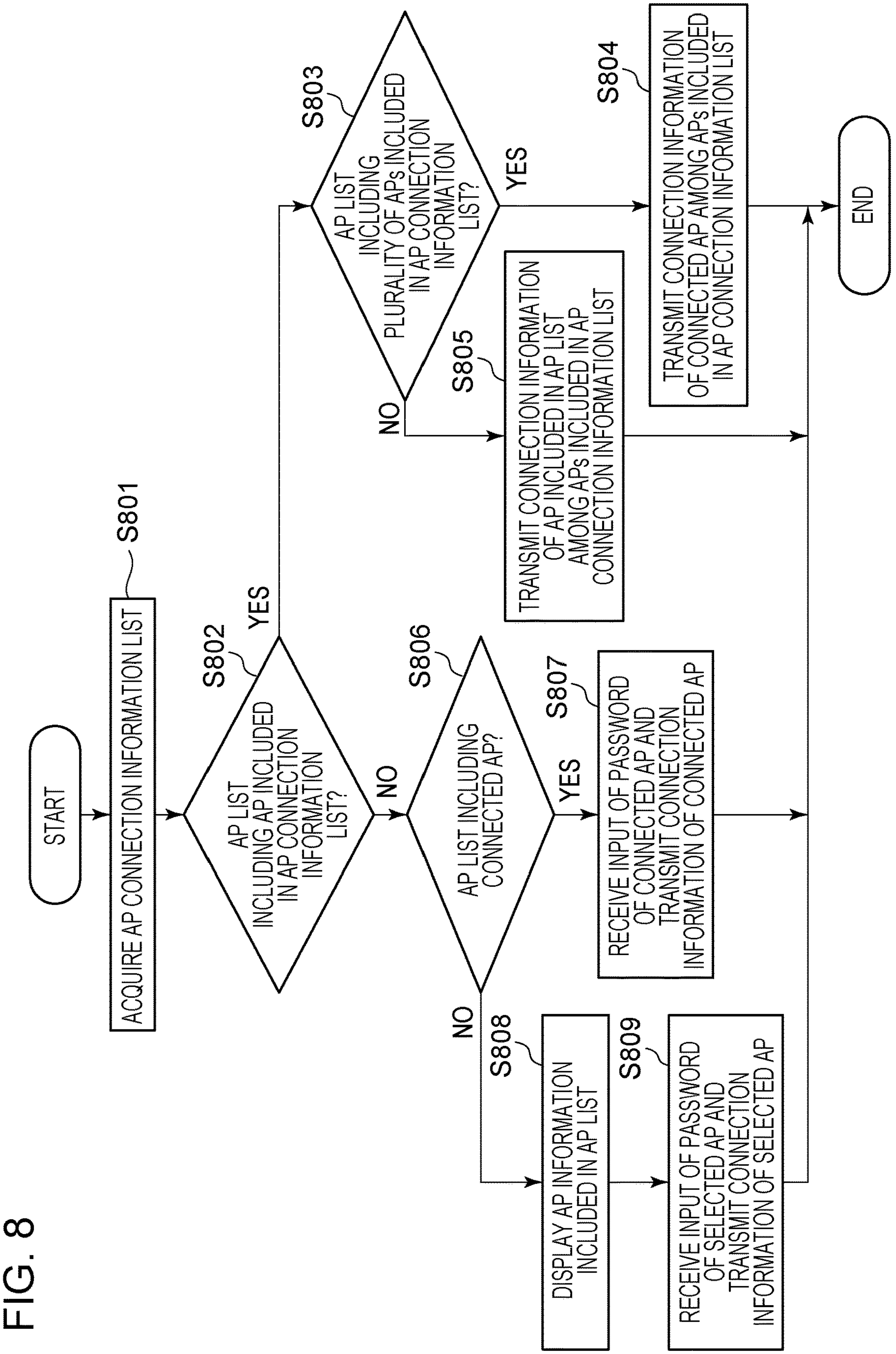
FIG. 8 is a flowchart illustrating a process performed by the information processing apparatus.

FIG. 8 is a flowchart illustrating details of a process executed by the information processing apparatus 101-*a* in S408 of the network setup process illustrated in FIG. 4. The flowchart illustrated in FIG. 8 is implemented by, for example, the CPU 103 reading the setting application stored in the ROM 104, the external storage device 106, or the like into the RAM 105 and executing the setting application.

In S801, the CPU 103 acquires an AP connection information list from the ROM 104 of the information processing apparatus 101-*a*. The AP connection information list contains connection information of one or more APs acquired from the communication apparatus 151-*a* and the communication apparatus 151-*c* in the connection information acquisition process.

In S802, the CPU 103 compares the list of access points (hereinafter referred to as an AP list) acquired from the communication apparatus 151-*b* in S407 with the AP connection information list acquired in S801. Then, the CPU 103 determines whether the APs included in the AP connection information list include any of the APs included in the AP list. Whether the APs included in the AP list include any of the APs included in the AP connection information list may be determined. The presence of an AP included in both lists is determined. If the CPU 103 determines YES in S802, the process proceeds to S803. If the CPU 103 determines NO in S802, the process proceeds to S806.

In S803, the CPU 103 determines whether the AP list includes a plurality of APs included in the AP connection information list. If the CPU 103 determines YES in S803, the process proceeds to S804. If the CPU 103 determines NO in S803, the process proceeds to S805. If the AP connection information list includes only one AP, NO is determined in S803.

If the AP list includes a plurality of APs included in the AP connection information list, then, in S804, the CPU 103 transmits connection information of a connected AP among the plurality of APs included in the AP connection information list and the AP list to the communication apparatus 151-*b*. If the AP list includes no connected AP, the CPU 103 may compare the AP connection information list with the AP list, and transmit connection information of an AP for which a match is first found to the communication apparatus 151-*b*. Specifically, for example, the APs in the AP connection information list are assigned numbers, and the CPU 103 compares the AP connection information list with the AP list in the order of the numbers. The CPU 103 may transmit the connection information of the AP given the number for which a match is first found to the communication apparatus 151-*b*.

In S805, the CPU 103 transmits connection information of an AP that is included in the AP connection information list and also included in the AP list to the communication apparatus 151-*b*.

The processing of S806 to S809 is similar to the processing of S504 to S507 in FIG. 5, and a description thereof will thus be omitted.

As described above, in this embodiment, the connection information of a plurality of APs, which is acquired from the communication apparatus 151-*a* and 151-*c* in the connection information acquisition process, is stored. This makes it more likely that the user can connect the communication apparatus 151-*b* to the AP 131 (the network 132) or the AP 133 (the network 134) without selecting an AP or inputting a password when the network setup for the communication apparatus 151-*b* is executed. Further, the CPU 103 compares the AP list with the AP connection information list, and if the AP list includes a plurality of APs included in the AP connection information list, the CPU 103 transmits connection information of a connected AP among the plurality of APs included in both lists to the communication apparatus 151-*b*. This makes it more likely that the infrastructure connection is performed between the information processing apparatus 101-*a* and the communication apparatus 151-*b*.

In this embodiment, the information processing apparatus 101-*a* acquires the connection information of the respective APs from the communication apparatuses 151-*a* and 151-*c* connected to a plurality of different networks to acquire and store connection information of a plurality of APs. This embodiment may also be applied to a configuration in which connection information of a plurality of APs is acquired from the communication apparatus 151-*a* connected to one network. Specifically, in FIG. 2, not only the connection information of the AP 131 but also connection information of other APs may be acquired from the communication apparatus 151-*a*. In this case, for example, if the connection information of an additional AP is newly acquired after the connection information of the AP 131 is acquired, the connection information of the AP 131 is not overwritten with the newly acquired connection information of the additional AP, but the connection information of the AP 131 and the connection information of the additional AP are stored. In the network setup process for the communication apparatus 151-*b*, in S804 in FIG. 8, the CPU 103 transmits the connection information of the connected AP among the APs corresponding to the connection information acquired in the connection information acquisition process to the communication apparatus 151-*b*.

In this embodiment, furthermore, if the AP list includes a plurality of APs included in the AP connection information list, the CPU 103 transmits connection information of a connected AP to the communication apparatus 151-*b*.

Alternatively, the CPU 103 may compare the AP connection information list with the AP list regardless of whether the AP list includes a connected AP, and transmit connection information of an AP for which a match is first found to the communication apparatus 151-*b*. Specifically, for example, the APs in the AP connection information list are assigned numbers, and the CPU 103 compares the AP connection information list with the AP list in the order of the numbers. The CPU 103 may transmit the connection information of the AP given the number for which a match is first found to the communication apparatus 151-*b*. Alternatively, the AP connection information list may be associated with position information such as Global Positioning System (GPS) positions of APs, which is acquired in the connection information acquisition process, and the CPU 103 may transmit connection information of an AP having a short distance from the information processing apparatus 101-*a* to the communication apparatus 151-*b*.

Other Embodiments

In the embodiments described above, the CPU 103 determines whether the AP list acquired from the communication apparatus 151-*b* includes an AP corresponding to connection information acquired from the communication apparatus 151-*a* or 151-*c* in the connection information acquisition process. Specifically, the determination of S502 or S802 is executed. Alternatively, the CPU 103 may transmit connection information acquired from the communication apparatus 151-*a* or 151-*c* in the connection information acquisition process to the communication apparatus 151-*b* without performing the determination. In other words, the CPU 103 may transmit connection information acquired from the communication apparatus 151-*a* or 151-*c* to the communication apparatus 151-*b* without receiving an AP list from the communication apparatus 151-*b*. Alternatively, although receiving an AP list from the communication apparatus 151-*b*, the CPU 103 may transmit connection information acquired from the communication apparatus 151-*a* or 151-*c* to the communication apparatus 151-*b* without performing the determination described above.

In the embodiments described above, before sending a request for an AP list to the communication apparatus 151-*b*, the CPU 103 may determine whether a connected AP is an AP corresponding to connection information of an AP acquired from the communication apparatus 151-*a* in the connection information acquisition process. If it is determined that the connected AP is not the AP corresponding to the connection information of the AP acquired from the communication apparatus 151-*a*, the CPU 103 may determine whether the information processing apparatus 101-*a* is connectable to the AP corresponding to the connection information of the AP acquired from the communication apparatus 151-*a*. If it is determined that the information processing apparatus 101-*a* is connectable to the AP corresponding to the connection information of the AP acquired from the communication apparatus 151-*a*, the CPU 103 may connect the information processing apparatus 101-*a* to the AP corresponding to the connection information of the AP acquired from the communication apparatus 151-*a*. That is, the information processing apparatus 101-*a* is connected in advance to the AP corresponding to the connection information of the AP acquired from the communication apparatus 151-*a*. This makes it more likely that the information processing apparatus 101-*a* can communicate with the communication apparatus 151-*b* via the AP when the communication apparatus 151-*b* connects to the AP. The information processing apparatus 101-*a* is not connectable to the AP corresponding to the connection information of the AP acquired from the communication apparatus 151-*a* when the information processing apparatus 101-*a* does not support a standard or an encryption method used for connection to the AP. For example, this may occur when the information processing apparatus 101-*a* is switched. If the information processing apparatus 101-*a* after the switching is the information processing apparatus 101-*a* that restores the backup data of the information processing apparatus 101-*a* before the switching, the connection information of the AP acquired from the communication apparatus 151-*a* is stored. Alternatively, if the information processing apparatus 101-*a* after the switching is the information processing apparatus 101-*a* that is synchronized with the information processing apparatus 101-*a* before the switching, the connection information of the AP acquired from the communication apparatus 151-*a* is stored. Accordingly, even if the information processing apparatus 101-*a* after the switching is not connectable to the AP corresponding to the connection information of the AP acquired from the communication apparatus 151-*a*, the connection information of the AP can be transmitted to the communication apparatus 151-*b*.

In the embodiments described above, the CPU 103 acquires connection information of an AP from the communication apparatus 151-*a* and stores the acquired connection information in the ROM 104, the memory, or the like. However, the present invention is not limited to these embodiments. In one example, the apparatuses belonging to the network 132 illustrated in FIG. 2 are allowed to use an external cloud server or various Internet services such as web pages. In such an environment, the CPU 103 can store the connection information of the AP acquired from the communication apparatus 151-*a* in the cloud server. The linking of the setting application with the user's own account information in the cloud server eliminates the need for the user to input an ID and a password when accessing the cloud server. The communication apparatus 151-*a* may be linked with the user's own account information in the cloud server, which enables the communication apparatus 151-*a* to directly store the connection information of the AP in the cloud server without the intervention of the information processing apparatus 101-*a*. This can simplify the process of storing the connection information of the AP.

In the embodiments described above, furthermore, the network setup is implemented such that connection information is transmitted between the information processing apparatus 101 and the communication apparatus 151 via a Wi-Fi connection. However, the present invention is not limited to these embodiments. In an embodiment, the network setup may be implemented such that connection information is transmitted between the information processing apparatus 101 and the communication apparatus 151 via a connection based on a communication method other than Wi-Fi, such as BLE. In this embodiment, the information processing apparatus 101 can connect to the communication apparatus 151 via BLE while maintaining the Wi-Fi connection with the connected AP. In another embodiment, the communication apparatus 151-*a* may implement WEC using the DPP to transmit the connection information of the AP to the communication apparatus 151-*b*, or may implement a setup using the HTTP to transmit the connection information of the AP to the communication apparatus 151-*b*.

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2021-161544, filed Sep. 30, 2021, which is hereby incorporated by reference herein in its entirety.

What is claimed is:

1. A method for controlling an information processing apparatus, the method comprising:

receiving from a user an instruction to register a first communication apparatus;

establishing a wireless connection between the information processing apparatus and a first access point;

establishing a wireless connection between the first communication apparatus and the first access point;

executing, based on the receiving from the user the instruction to register the first communication apparatus, a registration process of (a) acquiring, from the first communication apparatus connected to the first access point, specific information regarding the first communication apparatus, (b) acquiring, from the first communication apparatus connected to the first access point, first connection information for connecting to the first access point, the first connection information including a password used by the first communication apparatus to connect to the first access point, (c) storing the acquired first connection information in a storage area; and transmitting the first connection information, which had been acquired and stored based on the receiving from the user the instruction to register the first communication apparatus, to a second communication apparatus that is not registered and is different from the first communication apparatus via communication conforming to a communication scheme that is not via an external access point.

2. The method according to claim 1, wherein the first connection information includes a service set identifier (SSID) of the first access point.

3. The method according to claim 1, wherein, in the storing, the first connection information is stored in an external server.

4. The method according to claim 1, further comprising:

connecting the information processing apparatus to the first access point after transmitting the stored first connection information to the second communication apparatus.

5. The method according to claim 1, wherein the first communication apparatus and the second communication apparatus are each a printer.

6. The method according to claim 1, further comprising transmitting a print job for executing printing to the second communication apparatus via an access point to which the second communication apparatus is connected.

7. The method according to claim 1, wherein the specific information includes information about a name of the first communication apparatus.

8. The method according to claim 1, wherein the specific information includes a media access control (MAC) address of the first communication apparatus.

9. The method according to claim 1, wherein the specific information includes at least one of information about a sheet size, information about a sheet type, information about an edge setting, or information about a double-sided setting, which are available for use by the first communication apparatus having a printing function.

10. The method according to claim 1, wherein the registration process is a process of registering the first communication apparatus in a specific application which has been installed in the information processing apparatus and is controllable by the transmitting.

11. The method according to claim 1, wherein the specific information includes capability information of the first communication apparatus related to printing; and wherein the registration process is a process of registering information of the first communication apparatus in the information processing apparatus so as to enable transmission of a print job to the first communication apparatus.

12. The method according to claim 1, further comprising:

obtaining, before the transmitting, search result information from the second communication apparatus via communication conforming to the communication scheme that is not via an external access point, the search result information indicating one or more access points found by executing an access point search by the second communication apparatus, wherein the transmitting the stored first connection information to the second communication apparatus is performed based on information of the first access point corresponding to the stored first connection information being included in the search result information obtained from the second communication apparatus.

13. The method according to claim 12, wherein based on information of the first access point corresponding to the stored first connection information being not included in the search result information, the stored first connection information is not transmitted to the second communication apparatus.

14. The method according to claim 13, further comprising:

displaying, on a display of the information processing apparatus, a screen for receiving an input of a password of a second access point, based on information of the first access point corresponding to the stored first connection information being not included in the search result information and the second access point to which the information processing apparatus is being connected when at least a setting operation is performed being included in the search result information.

15. The method according to claim 14, further comprising transmitting, to the second communication apparatus, second connection information for connecting to the second access point, in response to receipt of an input of the password of the second access point from a user on the displayed screen, the second connection information including the password of the second access point.

16. The method according to claim 15, further comprising acquiring, from the second communication apparatus, connection information for connecting to the second access point, in response to the second communication apparatus establishing a connection with the second access point by using the transmitted second connection information.

17. The method according to claim 14, further comprising:

displaying, on the display of the information processing apparatus, information indicating the one or more access points included in the search result information, based on information of the second access point being not included in the search result information;

receiving selection of an access point, as a third access point, from among the one or more access points included in the search result information displayed on the screen; and transmitting, in response to receipt of an input of a password of the third access point selected from a user, third connection information for connecting to the third access point to the second communication apparatus.

18. The method according to claim 17, further comprising acquiring, from the second communication apparatus, connection information for connecting to the third access point, in response to the second communication apparatus establishing a connection with the third access point by using the transmitted third connection information.

19. An information processing apparatus comprising:

one or more processors; and memory storing one or more programs configured to be executed by the one or more processors, the one or more programs including instructions for:

receiving from a user an instruction to register a first communication apparatus;

establishing a wireless connection between the information processing apparatus and a first access point;

establishing a wireless connection between the first communication apparatus and the first access point;

executing, based on the receiving from the user the instruction to register the first communication apparatus, a registration process of (a) acquiring, from the first communication apparatus connected to the first access point, specific information regarding the first communication apparatus, (b) acquiring, from the first communication apparatus connected to the first access point, first connection information for connecting to the first access point, the first connection information including a password used by the first communication apparatus to connect to the first access point, and (c) storing the acquired first connection information in a storage area; and transmitting the first connection information, which had been acquired and stored based on the receiving from the user the instruction to register the first communication apparatus, to a second communication apparatus that is not registered and is different from the first communication apparatus via communication conforming to a communication scheme that is not via an external access point.

20. A non-transitory storage medium for causing a computer of an information processing apparatus to execute:

receiving from a user an instruction to register a first communication apparatus;

establishing a wireless connection between the information processing apparatus and a first access point;

establishing a wireless connection between the first communication apparatus and the first access point;

executing, based on the receiving from the user the instruction to register the first communication apparatus, a registration process of (a) acquiring, from the first communication apparatus connected to the first access point, specific information regarding the first communication apparatus, (b) acquiring, from the first communication apparatus connected to the first access point, first connection information for connecting to the first access point, the first connection information including a password used by the first communication apparatus to connect to the first access point, and (c) storing the acquired first connection information in a storage area; and transmitting the first connection information, which had been acquired and stored based on the receiving from the user the instruction to register the first communication apparatus, to a second communication apparatus that is not registered and is different from the first communication apparatus via communication conforming to a communication scheme that is not via an external access point.

* * * * *